(12) United States Patent
Uceda-Sosa (10) Patent No.: US 7,702,647 B2
(45) Date of Patent: Apr. 20, 2010

(54) METHOD AND STRUCTURE FOR UNSTRUCTURED DOMAIN-INDEPENDENT OBJECT-ORIENTED INFORMATION MIDDLEWARE

(75) Inventor: Rosario Uceda-Sosa, Harisdale, NY (US)

(73) Assignee: International Business Machines Corporation, Armonk, NY (US)

( * ) Notice: Subject to any disclaimer, the term of this patent is extended or adjusted under 35 U.S.C. 154(b) by 1462 days.

(21) Appl. No.: 10/326,380

(22) Filed: Dec. 23, 2002

(65) Prior Publication Data

US 2004/0133537 A1   Jul. 8, 2004

(51) Int. Cl.
*G06F 17/30* (2006.01)
(52) U.S. Cl. .............................. 707/103 R; 707/103 Y; 707/101; 707/102
(58) Field of Classification Search ........................ None
See application file for complete search history.

(56) References Cited

U.S. PATENT DOCUMENTS

| | | | |
|---|---|---|---|
| 5,784,286 A | 7/1998 | Hirose et al. | |
| 5,970,490 A | 10/1999 | Morgenstern | |
| 6,374,252 B1 * | 4/2002 | Althoff et al. | ............... 707/102 |
| 6,400,996 B1 | 6/2002 | Hoffberg et al. | |
| 6,505,209 B1 | 1/2003 | Gould et al. | |
| 6,640,145 B2 | 10/2003 | Hoffberg et al. | |
| 6,780,589 B1 | 8/2004 | Gulati | |
| 6,850,252 B1 | 2/2005 | Hoffberg | |
| 6,988,093 B2 | 1/2006 | Pic et al. | |
| 7,150,015 B2 * | 12/2006 | Pace et al. | ................. 717/176 |
| 2002/0129017 A1 * | 9/2002 | Kil et al. | ........................ 707/6 |
| 2003/0014421 A1 * | 1/2003 | Jung | .......................... 707/102 |

\* cited by examiner

*Primary Examiner*—Cam Y T Truong
(74) *Attorney, Agent, or Firm*—McGinn IP Law Group, PLLC (57) ABSTRACT

A structure and method are provided which can model and use information in a systematic, domain-independent manner, which can flexibly represent declarative data such as concepts, instances, relations and contexts and data views, and which may serve as a middleware module for user applications. The invention teaches a syntax and functionality of a set of software objects that represent, store and dynamically retrieve information on behalf of user applications.

18 Claims, 5 Drawing Sheets

METHOD AND STRUCTURE FOR UNSTRUCTURED DOMAIN-INDEPENDENT OBJECT-ORIENTED INFORMATION MIDDLEWARE

CROSS-REFERENCE TO RELATED APPLICATIONS

The present Application is related to U.S. patent application Ser. No. 10/326,400, filed on Dec. 23, 2002, to Rosario Uceda-Sosa, entitled "METHOD AND STRUCTURE FOR DOMAIN-INDEPENDENT MODULAR REASONING AND RELATION REPRESENTATION FOR ENTITY-RELATION BASED INFORMATION STRUCTURES", and to U.S. patent application Ser. No. 10/326,375, filed on Dec. 23, 2002, to Rosario Uceda-Sosa, entitled "METHOD AND STRUCTURE FOR TEMPLATE-BASED DATA RETRIEVAL FOR HYPERORAPH ENTITY-RELATION INFORMATION STRUCTURE", both assigned to the present assignee, and both incorporated herein by reference.

BACKGROUND OF THE INVENTION

1. Field of the Invention

The present invention generally relates to a set of software objects that represent, store, and dynamically retrieve information on behalf of user applications, thereby facilitating the implementation of information systems. These software objects model the structural properties of information, independently of semantics.

2. Description of the Related Art

Information systems where agents, human or artificial, interact with interconnected information resources are called "distributed knowledge environments." These systems are the emerging information model of networks, ranging from digital library systems to the Internet and multi-agent cooperative environments. The information resources typically are databases that function as passive file cabinets.

Agents must know the structure of the filing system in order to use it. That is, they must know which cabinet (table or view) contains the data they wish to access and must know or deduce why the data was stored there. For example, to access a database on real estate data, a human real estate agent must know that a table House contains the city and price of houses, and that houses are located in cities, and have prices.

This example is trivial enough. However, when data belongs to a specialized domain or when it needs to be discovered, as often happens in distributed systems, agents do not know the details of the data organization in advance. Also, different agents view and organize data in different ways. For example, a human agent who is a tax attorney might view houses as taxable properties, while a human agent who is a prospective buyer might be more interested in houses as habitation units having attributes such as bedrooms, bathrooms, etc.

Building these open-ended information environments is a daunting task. For example, how can data be modeled when it is not known how it is going to be used? Additionally, how can a human or software agent access data having an organization that is not known in advance? These questions are important to support intelligent agent systems where agents can evolve and share knowledge.

Therefore, there remains an unsolved challenge to model and use information in a systematic, domain-independent manner.

Even though a lot of work has been done in network information systems, such as semantic network and frame systems (KL-One family, like Classic or LOOM), there currently exists no low-level information network that can represent contexts and data views flexibly to meet the requirements above.

SUMMARY OF THE INVENTION

In view of the foregoing problems, drawbacks, and disadvantages of the conventional systems, it is a purpose of the present invention to provide a structure (and method) which can model and use information in a systematic, domain-independent manner.

It is another purpose of the present invention to provide a structure and method for a low level information network that can flexibly represent declarative data such as concepts, instances, relations and contexts and data views, and which serves as a middleware module for user applications.

It is another purpose of the present invention to teach a syntax and functionality of a set of software objects that represent, store, and can dynamically retrieve information on behalf of user applications.

To achieve the above and other purposes, in a first aspect of the present invention, described herein is a method (and structure) of representing information, including generating a first software object to comprise a first node, generating a second software object to comprise a second node, and generating a third software object to comprise a nexus that connects the first node and the second node. Further, at least one of the following is also allowed. First, a fourth software object can be generated as a third node, where the third node comprises the first node, the second node, and the nexus. Second, the nexus can be included in a fifth software object generated to be a fourth node.

In a second aspect of the present invention, described herein is a middleware module to represent and store information for a user application according the above-described method.

In a third aspect of the present invention, described herein is a data structure that stores information according to the above-described method.

In a fourth aspect of the present invention, also described herein is a signal-bearing medium tangibly embodying a program of machine-readable instructions executable by a digital processing apparatus to perform the above-described method.

Thus, the present invention comprises a set of software objects that facilitate the implementation of information systems. These objects model the structural properties of information, independently of semantics. Hence, they can be used to easily implement different information paradigms, from semantic networks and frames to relational databases. All these information systems can be integrated with each other through the common format described shortly. This invention provides a low level, yet powerful, abstraction of information that is common to most information systems currently used. For purpose of the present discussion, low level means at the network/graph level, that is, below the level of concepts and instances (which is usually called the epistemological level. In the exemplary embodiment described herein, information is represented as a graph with nodes, not concepts and instances.

The syntax and functionality of a set of software objects that represent, store, and dynamically retrieve information on behalf of user applications is described. This infrastructure does not depend on any specific data semantics or data organization and it can flexibly represent declarative data like concepts and instances, but also relations and contexts.

Hence, it can be applied to virtually any knowledge domain and any information paradigm, from relational databases to semantic networks.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
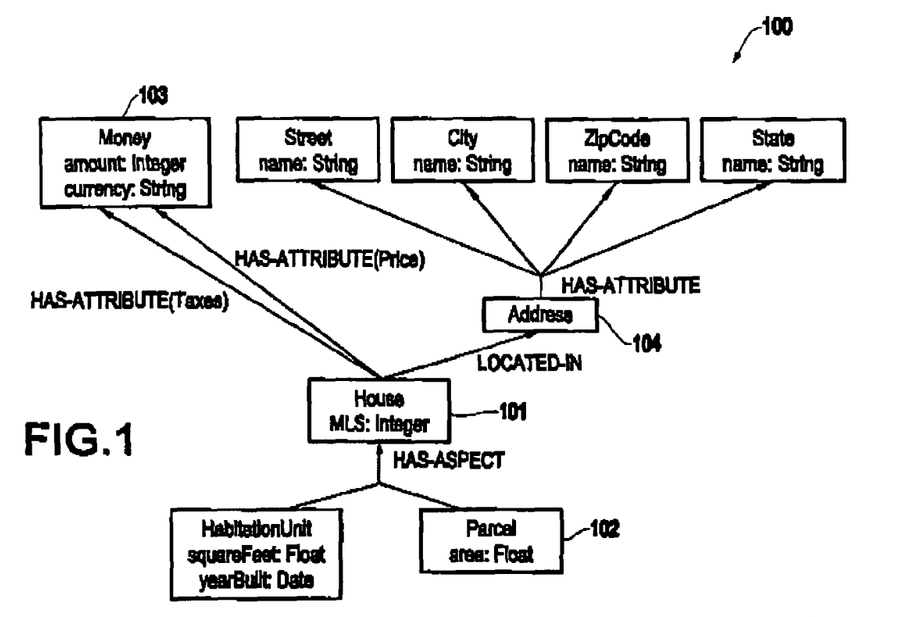
FIG. 1 illustrates an exemplary real estate ontology 100.

Referring now to the drawings, and more particularly to FIG. 1, a preferred embodiment will now be described as an intelligent multimedia interface with a real estate database. The present invention is a foundation aspect of a system called IRIS (Information Representation, Inferencing, and Sharing) implemented in one application as a real estate middleware module. However, although this exemplary embodiment is discussed herein for purpose of illustration, this discussion is not intended as meaning the present invention is thereby limited to this embodiment.

In FIG. 1, a repository of real estate data is organized by the ontology 100. Here, MLS stands for Multiple Listing Service, a unique identifier of a real estate property 101. A key advantage of IRIS is that it hides the complexity of data organization from agents, whether human agents such as real estate agents or software-implemented agents.

For example, if an agent wants to find information on houses available in a specific city, without knowing the details of the underlying ontology 100, IRIS can return a collection of house objects with data from House 101, Parcel 102, Money 103, and Address 104. To do this, IRIS must know what the entity boundaries of "House" are and what attributes or entities in its neighborhood must be selected.

The syntax and functionality of a set of software objects used in IRIS and that represent, store, and dynamically retrieve information on behalf of user applications is described below. IRIS does not depend on any specific data semantics or data organization and can flexibly represent declarative data such as concepts and instances, relations, contexts, and data views. Hence, it can be applied to virtually any knowledge domain and any information paradigm, from relational databases to semantic networks.

IRIS is generic enough to be implemented in any object-oriented environment. For the purpose of illustration only, the invention is described herein using Java-like conventions and as exemplarily implemented as an information infrastructure of an intelligent multimedia interface for real estate information. This implementation provides an intelligent multimedia interface having conversation, graphics and speech generation modules working as independent agents, with different information needs and accessing different repositories (domain, presentation and conversation).

Hereinbelow is described how the present invention, as exemplarily embodied in IRIS, allows data to be packaged in IRIS information capsules to form an IRIS space. Of the two above listed co-pending applications, the first discusses in greater detail how reasoning and inferencing aspects can be achieved on an entity/relation-based information structure such as one set up by the present invention. The second of the above listed co-pending applications discusses in greater detail the use of templates for querying an entity/relation-based information structure in the manner suggested by the above real estate example.

IRIS Spaces

IRIS stores information in IRIS spaces. Each space is an autonomous knowledge capsule that can be communicated and merged with others and is made up of data and its associated inferencing. The data of a space may include the data provided by the user, views, and contexts, as well as the relations among these. That is, an IRIS space comprises a graph containing user data together with the inferencing knowledge necessary to use this data graph. The library of the IRIS middleware supports the construction of one or more user-defined spaces, which are authored by users independently and which are independent of each other, but which can be integrated by the run-time system if desired.

The present invention addresses the basic structure and characteristics of these IRIS spaces. The inferencing aspect of IRIS as well as the template query aspect are both mentioned herein, but the theory and implementation of each of these aspects are more fully described in the above-listed co-pending patent disclosures.

Elements of an IRIS Space

An IRIS space is constructed using the following types of software objects: IData, IRIS nodes, and nexus. These software objects are implemented as instantiable classes in an object-oriented language.

IData:

IData is a named atomic container of information, which is located in an IRIS node (see below for description of an IRIS node, and see FIG. 2). An IData object is a pair <name, value>, where the name is optional. IData objects serve as means of addressing their associated data, which can be dynamically changed. There is an IData interface associated to IData objects whose methods are described below.

In IRIS as currently implemented, the data of an IData object can be any one of three types: data objects external to IRIS, standard data types in a programming language, or IRIS nodes (including any nexus incorporated as an element of an IRIS node).

Data objects external to IRIS: Any software object can be external raw data, as long as the set of functions (methods), collectively called the IData Interface, indicated below is provided:

1. STRING IData.getName( ): Retrieves the name of the data;
2. DataContent IData.get( ): Retrieves the data content;
3. VOID IData.set(DataContent): Puts the information content into the slot;
4. BOOLEAN IData.equal(Object): Determines whether the data content of the IData is the same as an arbitrary object; and 5. Object IData.copy(int): Produces a new object of the same type, with different levels of depth in the copy.

Standard data types of the programming language used to code IRIS. In the case of Java, these are instances of numeric classes (Integer, Float, etc.), Boolean, and String.

IRIS Nodes. See below for a description of an IRIS node.

IRIS Nodes:

IRIS nodes are information containers which are directly addressable by the user. Nodes are described as special types of IData objects (implementing the IData interface) whose content can be a complex collection of IData objects, nodes and nexus (described below), and with links to other nodes or raw data. An IRIS node can have a name or be anonymous. IRIS nodes can be quite complex, containing sets of IData objects or even whole IRIS graphs. This last characteristic, referred to as self-similarity, distinguishes IRIS nodes from nodes in other network formalisms. It is characterized as also having a self-similar hypergraph ("fractal") format, meaning that a graph in the information structure comprises one or more nodes and each node potentially comprises an entire subgraph.

More specifically, in the exemplary embodiment, a node may contain one or more of the following types of information: (1) a list of IData objects and/or nodes, (2) a list of nexus of arbitrary arity to other nodes or raw data, and (3) a whole IRIS graph:

(1) A list of IData objects and/or nodes: IData objects and nodes are collectively called entities. There may exist a distinguished IData object called primaryData, which functions as the default content of a node. All other entities must be referenced directly by name. There is also a defaultRelationToEntities that describes the relation between the node and each of its content entities.

(2) A list of nexus of arbitrary arity to other nodes or raw data. There may be more than one link to a given set of nodes, and the different link may have the same or different arity. Nexus are a type of link, described in detail below.

The term "arity" refers to the number of elements interrelated by a relation. A relation is a set of ordered tuples (finite sequence, e.g., n_1, n_2, . . . , n_M, where $n_{13}$ 1, . . . N_M belong to an underlying set, called the domain of the relation). All tuples have the same number of elements (e.g., M elements in this example). The arity of a relation is the number of elements of every tuple.

The mathematical definition of arity is that an M-ary relation on a domain D, is a subset of the Cartesian product D×D× . . . ×D (D appears M times). This means that any relation relates a given number of elements. This fixed number is the arity.

(3) A whole IRIS graph: In addition to IData objects and links, certain nodes can contain a whole IRIS graph. This aspect, called "self-similarity", distinguishes the nodes of the present invention from nodes of other conventional systems. This aspect means that any IRIS graph (made up of nodes and nexus) can be described and addressed from a node. IRIS provides several mechanisms for graph description, as described in more detail below.

All of the members of a node can be dynamically added or deleted.

Nodes are designed to hold any user data, regardless of semantics, and including also, relations. Therefore, in IRIS, relations are entities that can be reasoned about and dynamically added to a space. In particular, relations may be related to other relations in hierarchies. The representation and management of relations is further described in the first of the two above listed co-pending patent disclosures. This aspect of the nodes of the present invention, in which relations can be nodes, is another distinguishing aspect from nodes in conventional systems.

An IRIS node can also be the data content of an IData object. In this case, the atomic container is said to "reference the node". There is one exception to this rule: the relation between atomic containers and nodes may not include loops. That is, a node may not be the content of one of its own atomic containers or of any nodes referenced, directly or indirectly to these atomic containers.

Figure 2:
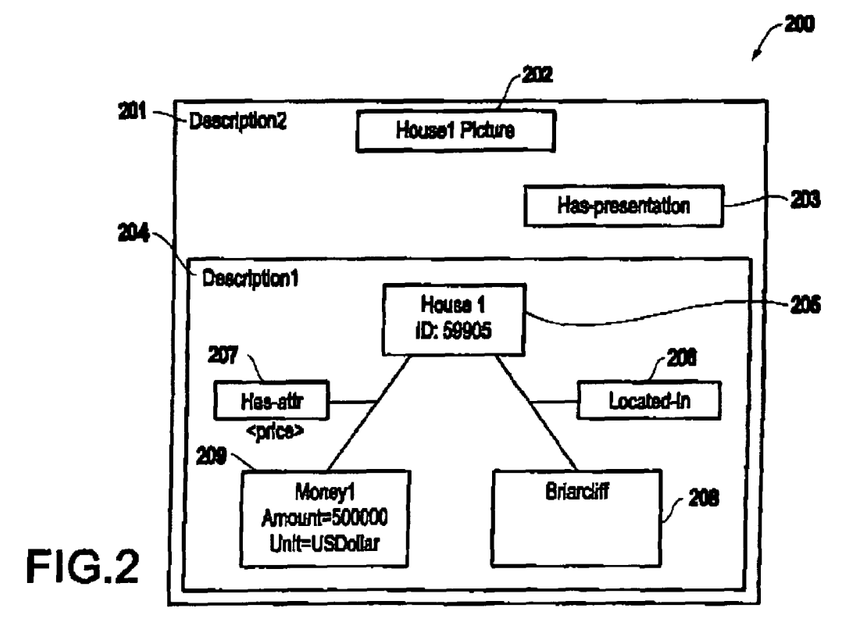
FIG. 2 illustrates an exemplary node configuration 200.

The sample node 200 illustrated in FIG. 2 is another example from the RealEstate domain. Every rectangle 201-209 is an IRIS node, including Description1 201 and Description2 204, both of which describe subgraphs.

More formally, a node may be defined as a tuple:

$$S=<[Label], N, C>$$

where the square brackets [ ] denote optional membership. S has an optional name, the label. N and C are two collections of nexus called, respectively, the neighborhood and the content of S.

Nexus:

Nexus associate an IRIS container (nexus or node) with other containers or with raw data. That is, nexus are extensions of hypergraph links. They connect two or more nodes, as links do, but they can also connect to raw data that is defined by the user.

More formally, a nexus may be a tuple:

$$<SE, TE, [label], [label\text{-}Param], map, [mapParam]>$$

where SE and TE are collections, optionally ordered, of containers (nexus and nodes), called the source ends and target ends, respectively. The optional label is either a string or a node. The label is a relation (node) and indicates why the nexus is traversed. labelParam is an optional string that names the target ends and may be used to name the members of TE when accessed through the nexus.

The map is a procedure that preferably runs every time the nexus is referenced, and returns TE. The map is an object that describes how the nexus is navigated, either through explicit references (pointers), constraints, or methods. This means that a nexus may be dynamically evaluated when it is traversed, so an IRIS space may be only partially constructed at a given time. mapParam is a list of containers (nexus and nodes) that are parameters to the map.

The ends is the multiset of nodes and/or raw data that is navigated. That is, the ends describe what is navigated in the nexus. In particular, a nexus may have an arbitrary number of ends.

The combination of nodes as surrogates of graphs and nexus as generic navigation maps that may be dynamically obtained can be quite powerful. IRIS supports references, methods and IRIS templates as maps. Templates are the equivalent of queries in IRIS, described only briefly below in this discussion but in more detail in the second of the above listed co-pending applications.

Figure 3:
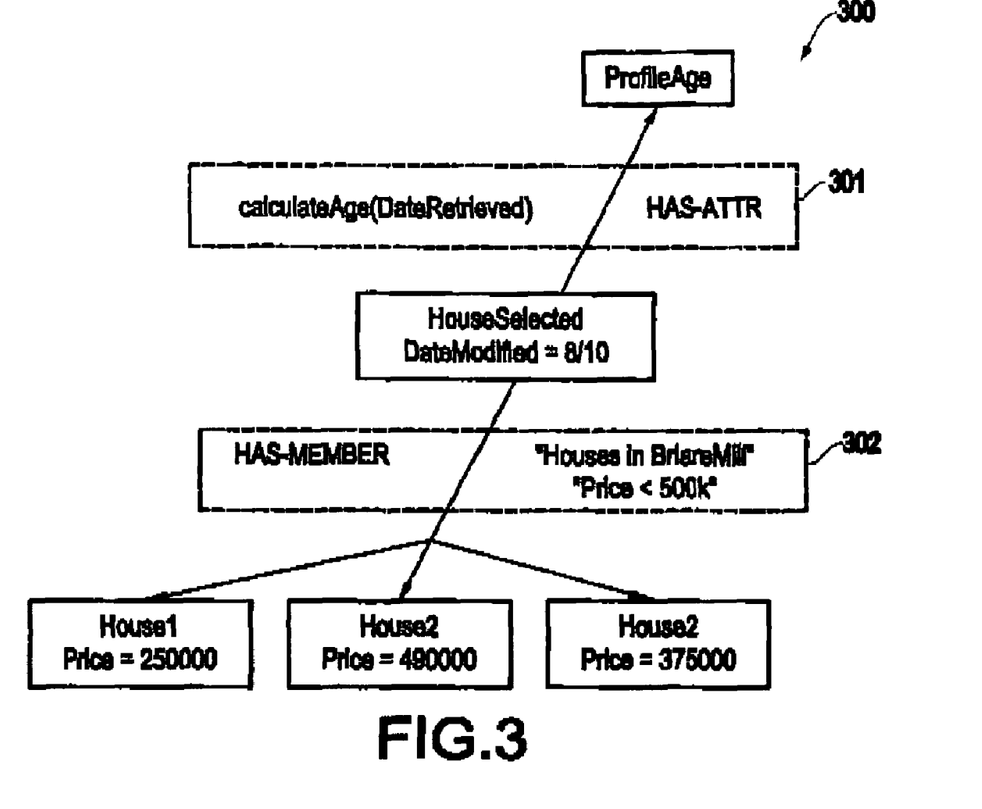
FIG. 3 illustrates a exemplary nexus configuration 300.

FIG. 3 shows sample nexus 300 from the real estate example. The dashed rectangles 301, 302 enclose the label and map (described below) of the nexus.

Nexus are different from links in traditional semantic networks or frames in that:

nexus can associate both nexus and nodes (that is, IRIS does not have a node/link structure as traditional networks do);

nexus separate the evaluation mechanism (the map) and the evaluation result, so they can be accessed uniformly;

nexus can be dynamically evaluated, by using either references, methods, or expressions drawn from an IRIS query language, so their arity and content may change from evaluation to evaluation; and nexus are usually associated to relations, but they can also denote sets of relations or constraints.

Maps

A map is an object that encapsulates the evaluation of data, either in a nexus or a node. Maps are objects that allow IRIS to reference information flexibly. That is, they can be used to either obtain new information or constraint the types of data that can be put in the space. A map preferably comprises a pair:

<constraints, [method/reference]>

The first member is a list of constraints and the second member is either a method or an explicit reference (pointer) to a function. A map may contain only one of these members, or both. Maps are placed in entities and nexus and address single entities, nexus and collections of structures. The location and semantics of maps are listed below:

1. In a node, there may be two maps: one map may describe the neighborhood and another map may describe the member entities. The first preferably describes a collection of entities (IData objects and nodes), while the second preferably describes either a collection of IRIS graphs or a collection of entities (IData objects and nodes).

2. In an IData object, there is an optional map to describe the content. This map describes one single raw data object or a IData object or a node.

3. In a nexus, there is an optional map that describes a collection of ends or a single raw data object.

In the example of FIG. 3, two maps 301, 302 associated to the nexus 300 are illustrated. The first one has a method called calculateAge( ), and the second has a set of constraints that identifies houses in Briarcliff whose prices are less than 500 k.

Construction of IRIS Spaces

Figure 4:
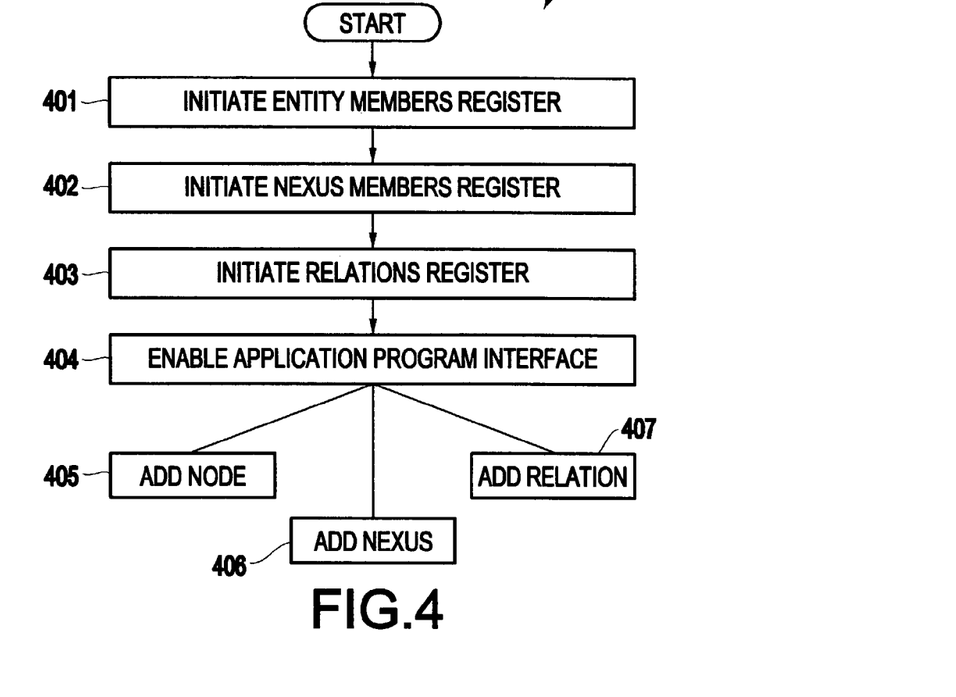
FIG. 4 is a flowchart of an exemplary method 400 for creating an IRIS (Information Representation, Inferencing, and Sharing) space.

FIG. 4 is a flowchart of a preferred method 400 used by the IRIS middleware for constructing an IRIS space. A graphical user interface (GUI), discussed later, allows a user to interact with the middleware.

Each IRIS space keeps a registry of all its nexus and nodes. This may be accomplished through three registries: one references all the entities (called entityMembers), the second references all the top level nexus (called nexusMembers) and the third references relations (called relations). An IRIS space preferably is itself a node with two special characteristics:

It may not be contained in any other node; and

It has an IRIS Relation Algebra (further described in the first of the above-listed copending patent disclosure).

Thus, in steps 401-403, the middleware sets up these registries and in step 404 enables the Application Program Interface (API) described below to allow the user to fill in data for the space. In steps 405-407, the user adds nodes, nexus, and relations as desired for that IRIS space, through the following API:

1. INodeISpace.AddNode(STRING name, LISTIDataObjects, IMAP neighborhoodMap, IMAP containmentMap)—Adds a node to the space registry by including it in the entityMembers map. It should be noted that since nodes are special types of IData objects, the second parameter is a list of IData objects, some of which may be nodes. The two maps are optional and are described in the section "Maps" above. If the operation is successful, the new IRIS node is returned.

2. NexusISpace.AddNexus(STRING name, LIST Nodes, IMAP endsMap)—Adds a nexus to the space registry through the linkLabels registry. The second parameter is a list of nodes, and the third, a map that describes the ends. In each nexus there must be at least one non null node in the Nodes list. If the operation is successful, the new IRIS nexus is returned.

3. IRelationISpace.AddRelation(IRelation newRelation)—The new relation is further described in the first of the above-listed copending patent disclosures: "Domain-Independent Modular Reasoning and Relation Representation for Entity-Relation Based Information Structures". If the operation is successful, then the new IRIS relation is returned.

Simple Data Retrieval

Figure 5:
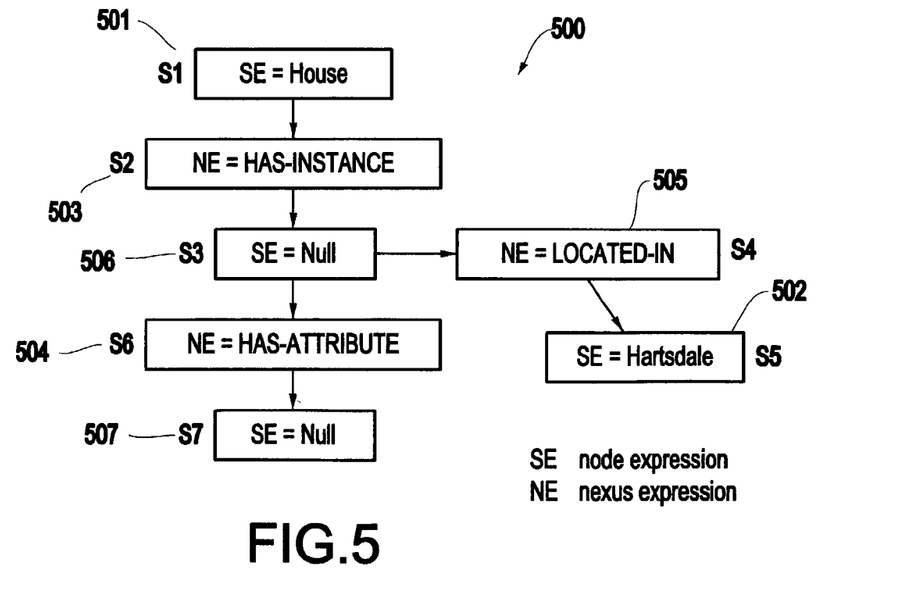
FIG. 5 shows a simple template 500 for a query.

The simplest way to extract information from IRIS spaces is to locate nodes by querying the space maps for the name sought after. There are several other ways to extract information, described in the second above-listed co-pending patent disclosure, and the process of information extraction is described in greater detail in that disclosure. As a simple example, the template 500 in FIG. 5 may conduct a real estate query in which information is requested on houses 501 available in the city of Hartsdale 502. As noted, this simple template query 500 contains various node expressions 501, 502, 506, 507 and nexus expressions 503, 504, 505.

Once the node has been located by name, its IData objects or neighbor nodes can be queried by name. Also, the content of nodes can be queried through their get( ) methods. Given a node, the following API is used to retrieve node information:

Object getData(INode node, IData name)—retrieves the node's data from the IData object name.

Object getData(INode node)—retrieves the node—s get( ).

In each of these functions, if the value to be returned is an IRIS node, then its get( ) is called until a non-node value is found.

In these definitions a Java-like API has been used, taking advantage of the class Object, which is a superclass of every other class, and of the reflection API. If IRIS is implemented in another object-oriented language, a common superclass of every the IRIS related classes would have to be defined, including user-defined object. Furthermore, each IData object (included nodes) needs to store type metadata about its data content, with special fields for each of the native types, and one field for the instances of the common superclass.

IRIS Applications

Applications wishing to use IRIS as their information infrastructure may extend the base IRIS classes (Nexus, Node and Relation) to capture information specific to the knowledge domain and purpose of the application. The data itself is either raw external data (primitive data types or user defined objects) or Java classes that implement the IData Interface and can be viewed by IRIS as IData objects.

Retrieval of data can also be extended with more specialized methods, but the basic IRIS retrieval and navigation methods may be used to retrieve nodes, IData objects and raw data.

IRIS Architecture

IRIS was developed as the information infrastructure of an intelligent user interface, RIA (Responsive Information Architect) that interprets the end user's request for information and crafts a multimedia presentation (graphics and speech) on the fly. Each of the modules of RIA (graphics designer, speech designer, conversation manager) works as an agent that requires domain and presentation information from different perspectives. IRIS offers a unified information repository that at the same time is dynamically tailored to the modules' needs.

Figure 6:
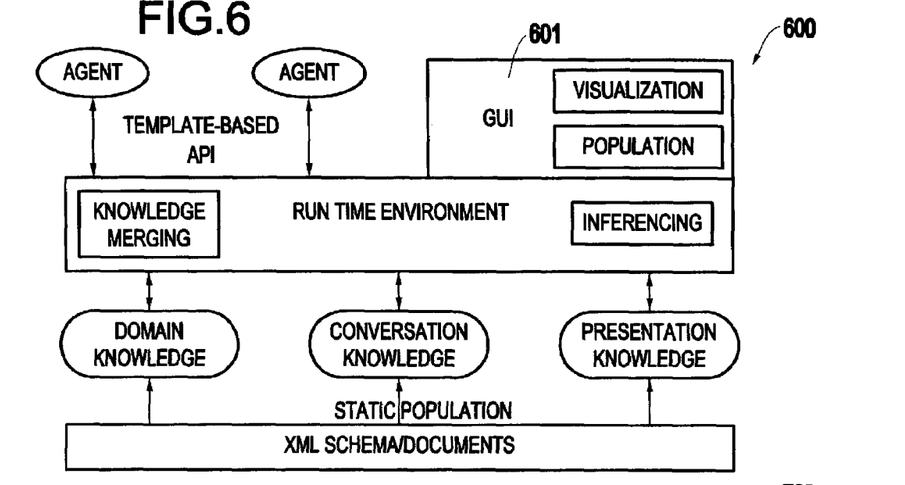
FIG. 6 is an exemplary IRIS architecture 600.

The features of IRIS have been selected to satisfy the needs of several, possibly independent, agents accessing distributed information sources. In the realm of the RIA, IRIS represents domain, media and upper ontologies and data, as well as the conversational structure of the interface, in sizable spaces (50,000 nodes, 75,000 nexus). FIG. 6 depicts the architecture 600 of the prototype.

Figure 7:
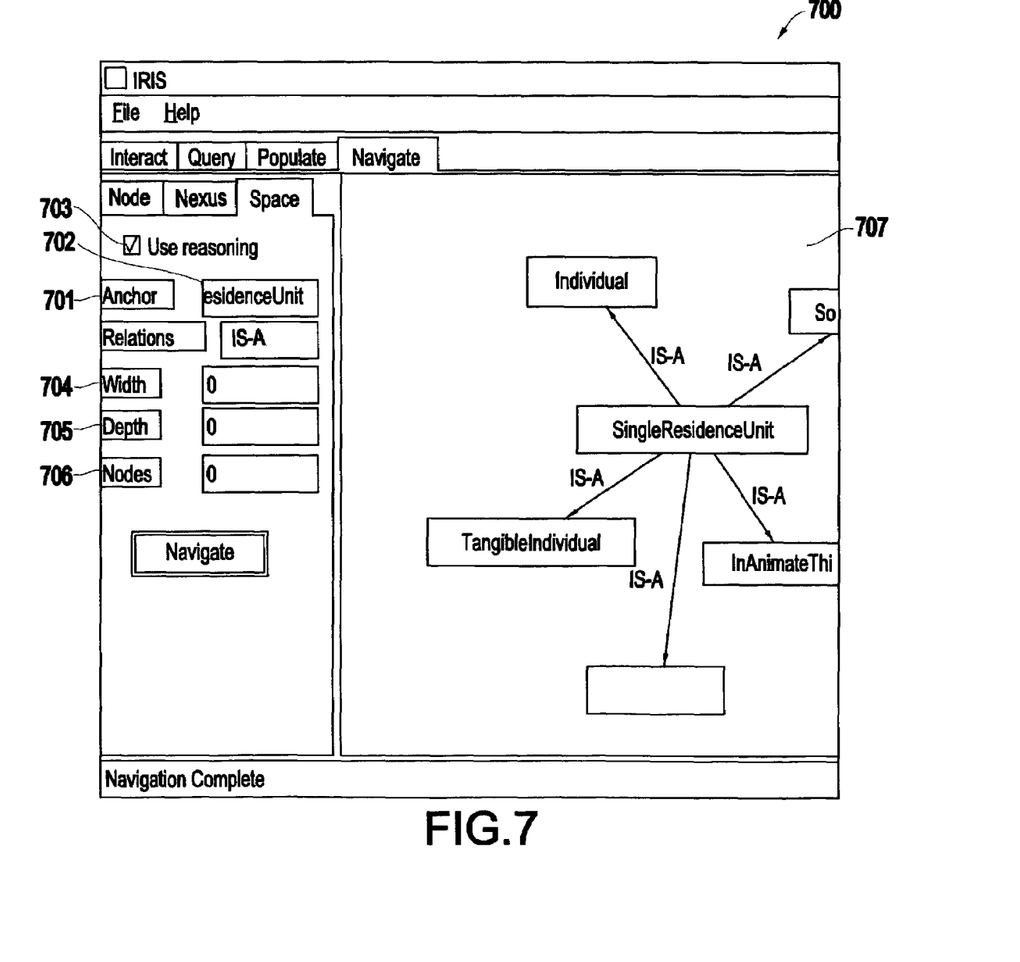
FIG. 7 illustrates an exemplary IRIS GUI (Graphic User Interface) 700.

A GUI 601 is also provided for the population and visualization of spaces, as well to issue simple template-based queries. FIG. 7 is a fragment 700 of a screen capture of the working interface with the prototype real estate and upper ontology. The GUI 601 provides population tools and visualization tools, as well as a simple template-based query facility.

In FIG. 7, the Space subpane is used to issue simple template-based queries. In the example, the anchor 701 is SingleResidenceUnit 702, and the Use reasoning tag 703 indicates that the relations shown are obtained through inferencing, regardless of what the underlying relations on the IRIS space are. The Width 704, Depth 705, and Nodes 706 restrict the shape of the result. In particular, Nodes 706 indicates the maximum number of descendants of the anchor to be obtained. The entire pane 707 defines a simple template, as discussed briefly above.

A prototype of IRIS has been implemented as a library of information services in Java, and is fully operational. IRIS was designed to serve as an information infra-structure to a multimedia intelligent interface, where the modules of the architecture work as independent agents that access several repositories and require specific data content and organization. Since the present invention defines the range of information services, these agents are enabled to access integrated, yet customized information.

Even though the IRIS middleware has been described herein using Java-like conventions, it is generic enough to be implemented in any Object-Oriented environment. This infrastructure does not depend on any specific data semantics or data organization and it can flexibly represent not only declarative data like concepts and instances, but also relations, contexts, and even constraints and methods. Hence, it can be applied to virtually any knowledge domain and any information paradigm, from relational databases to semantic networks.

Other examples where IRIS middleware has been applied to date include automated auto diagnosis, authoring of business rules for e-commerce, and autonomic computing.

Exemplary Hardware Implementation

Figure 8:
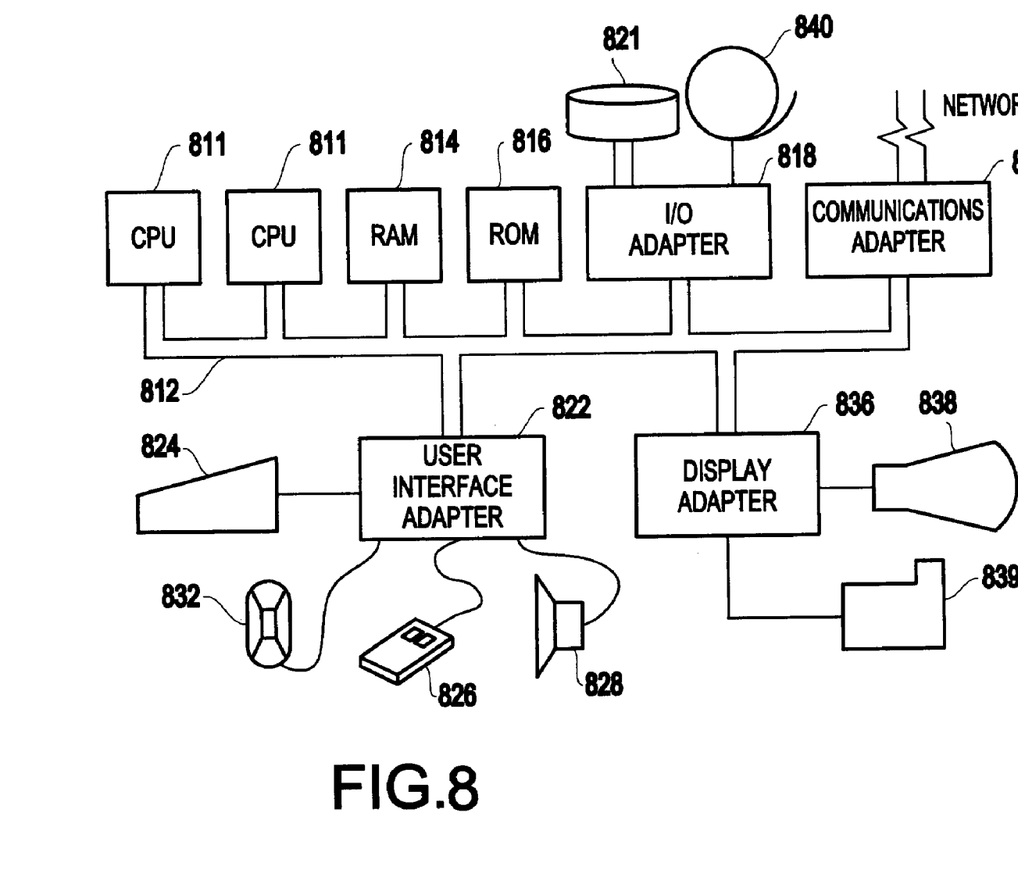
FIG. 8 illustrates an exemplary hardware/information handling system 800 for incorporating the present invention therein.

FIG. 8 illustrates a typical hardware configuration 800 of an information handling/computer system in accordance with the invention and which preferably has at least one processor or central processing unit (CPU) 811.

The CPUs 811 are interconnected via a system bus 812 to a random access memory (RAM) 814, read-only memory (ROM) 816, input/output (I/O) adapter 818 (for connecting peripheral devices such as disk units 821 and tape drives 840 to the bus 812), user interface adapter 822 (for connecting a keyboard 824, mouse 826, speaker 828, microphone 832, and/or other user interface device to the bus 812), a communication adapter 834 for connecting an information handling system to a data processing network, the Internet, an Intranet, a personal area network (PAN), etc., and a display adapter 836 for connecting the bus 812 to a display device 838 and/or printer 839 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing storage media.

Thus, this aspect of the present invention is directed to a programmed product, comprising signal-bearing storage media tangibly embodying a program of machine-readable instructions executable by a digital data processor incorporating the CPI J 811 and hardware above, to perform the method of the invention.

Figure 9:
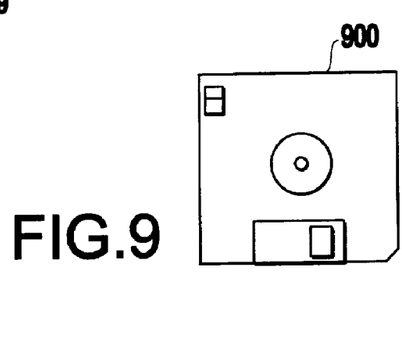
FIG. 9 illustrates a signal bearing medium 900 (e.g., storage medium) for storing steps of a program of a method according to the present invention.

This signal-bearing storage media may include, for example, a RAM contained within the CPU 811, as represented by the fast-access storage for example. Alternatively, the instructions may be contained in another signal-bearing storage media, such as a magnetic data storage diskette 900 (FIG. 9), directly or indirectly accessible by the CPU 811.

Whether contained in the diskette 900, the computer/CPU 811, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape). Other suitable signal-bearing media include memory devices in transmission media and instructions stored in formats such as digital and analog and memory devices in communication links and wireless. In an illustrative embodiment of the invention, the machine-readable instructions may comprise software object code.

It should also be obvious to one of ordinary skill in the art that the technique of the present invention could be implemented on a network in a variety of configurations.

For example, a user at a computer having an API module could be remote from a computer which has IRIS space data stored in memory allows the remote user to query the pre-existing IRIS space data. As another example, a computer at one location could be used to prepare and/or store the IRIS space data, which prepared space data is then sent to another computer for storage and/or usage. The network could also be used to allow the transfer of the middeware module to download for remote users.

In sum, there are many network-based representations, from semantic networks and frames to more recent KL-ONE based systems, like LOOM or CLASSIC, which are known to those of ordinary skill in the art. Due to its emphasis on distributed knowledge environments, the present invention differs from these systems in several way. For example, representation and inferencing are systematic according to the present invention, and are independent of specific relations. Also, the representation of queries and descriptions according to the present invention are integrated to allow for dynamic addition of categories in the interface, but not for their automatic classification.

Additionally, the invention uses inferencing to organize data according to the user's needs, as opposed to providing a deeper understanding of the data categorizations. And, IRIS focuses on small distributed repositories, as opposed to large ontologies like CYC or WordNet. This assumption is more natural in environments like the Internet.

There are at least three attributes of the information-container structure (space) of IRIS that distinguish it from conventional systems.

First, the information-container structure embodied by IRIS supports self-similarity. This means that a node can contain an entire graph, i.e., a network of nodes interconnected by nexus. This aspect of IRIS is an extension to a conventional hypergraph.

Second, the information-container structure embodied by IRIS allows a nexus (relation) to be a node. This feature is significant because it allows each such nexus-node to be, in turn, interconnected by a nexus. Thus, in IRIS, there is the unique ability to have "relations on relations".

Third, the nexus defined in the information-container structure embodied by IRIS can have multiple ends. That is, a nexus can connect an arbitrary number of nodes.

While the invention has been described in terms of a single preferred embodiment, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what I claim as new and desire to secure by Letters Patent is as follows:

1. A method of representing information, said method comprising:
   generating, using a processor on a computer, a first software object comprising a first node;
   generating a second software object comprising a second node, using said processor;
   generating a third software object comprising a nexus that connects said first node and said second node, using said processor, said nexus being a type of link or an extension of a hypergraph link;
   performing at least one of the following, using said processor:
      generating a fourth software object as a third node, said third node comprising said first node, said second node, and said nexus; and
      generating a fifth software object as a fourth node, said fourth node comprising said nexus; and
   directing said at least one of said fourth and fifth software objects to a memory for storage;
   wherein said first node, said second node, and said third node serve as respective information containers directly addressable by a user and each of the nodes has a format as a tuple:

$S$=[Label], $N$, $C$>, where the label comprises a name which is optional, and N and C comprise two collections of nexus representing, respectively, a neighborhood and a content of S.

2. The method of claim 1, wherein said nexus has a format as a tuple

<SE, TE, [label], [label-Param], map, [mapParam]> where SE and TE are collections, optionally ordered, of containers (nexus and nodes), representing source ends and target ends, respectively, (collectively, "ends"), label is optional and comprises one of a string and a node, labelParam comprises an optional string that names the target ends and is used to name the members of TE when accessed through the nexus, map comprises a procedure that runs every time the nexus is referenced, and returns TE, mapParam comprises a list of containers (nexus and nodes) that are parameters to the map, ends comprises a multiset of nodes and/or raw data that is navigated, and said nexus may have an arbitrary number of ends.

3. The method of claim 1, further comprising:
   selectively generating a sixth software object comprising a nexus to connect said fourth node to one of another node and a nexus, using said processor.

4. A computer comprising a processor executing a middleware module permitting said processor to represent and store information for a user application, said middleware module comprising:
   a library having a module to generate an information-container, said module comprising a set of machine-readable instructions embodied on a machine-readable storage medium and allowing for:
      generating a first software object comprising a first node;
      generating a second software object comprising a second node;
      generating a third software object comprising a nexus that connects said first node and said second node, said nexus being a type of link or an extension of a hypergraph link;
      performing at least one of the following:
         generating a fourth software object as a third node, said third node comprising said first node, said second node, and said nexus; and
         generating a fifth software object as a fourth node, said fourth node comprising said nexus; and
   an Application Program Interface (API) comprising a set of machine-readable instructions embodied on a machine-readable storage medium to allow a user to fill in data for said information-container generated by said module,
   said middleware module being executed by said processor on said computer as a middleware module of computer instructions, meaning that said middleware module is supported by an operating system currently running on said computer and said middleware module supports an application program currently running on said computer,
   wherein said first node, said second node, and said third node serve as respective information containers directly addressable by a user and each of the nodes has a format as a tuple:

$S$=[Label], $N$, $C$> where the label comprises a name which is optional, and N and C comprise two collections of nexus representing, respectively, a neighborhood and a content of S.

5. The computer of claim 4, wherein said nexus has a format as a tuple:

<SE, TE, [label], [label-Param], map, [mapParam]> where SE and TE are collections, optionally ordered, of containers (nexus and nodes), representing source ends and target ends, respectively, (collectively, "ends"), label is optional and comprises one of a string and a node, labelParam comprises an optional string that names the target ends and is used to name the members of TE when accessed through the nexus, map comprises a procedure that runs every time the nexus is referenced, and returns TE, mapParam comprises a list of containers (nexus and nodes) that are parameters to the map, ends comprises a multiset of nodes and/or raw data that is navigated, and said nexus may have an arbitrary number of ends.

6. The computer of claim 4, said module further allowing:
generating a sixth software object comprising a nexus to connect said fourth node to another node or nexus.

7. A data structure tangibly embodied in a computer-readable storage medium and representing information stored in a database, said data structure comprising:
a first software object comprising a first node;
a second software object comprising a second node;
a third software object comprising a nexus that connects said first node and said second node, said nexus being a type of link or an extension of a hypergarph link; and
at least one of the following:
a fourth software object generated as a third node, said third node comprising said first node, said second node, and said nexus; and
a fifth software object generated as a fourth node, said fourth node comprising said nexus,
wherein said first node, said second node, and said third node serve as respective information containers directly addressable by a user and each of the nodes has a format as a tuple:

$S=[Label], N, C$ where the label comprises a name which is optional, and N and C comprise two collections of nexus representing, respectively, a neighborhood and a content of S.

8. The data structure of claim 7, said nexus having a format as a tuple:

$<SE, TE, [label], [label-Param], map, [mapParam]>$ where SE and TE are collections, optionally ordered, of containers (nexus and nodes), representing source ends and target ends, respectively, (collectively, "ends"), label is optional and comprises one of a string and a node, labelParam comprises an optional string that names the target ends and is used to name the members of TE when accessed through the nexus, map comprises a procedure that runs every time the nexus is referenced, and returns TE, mapParam comprises a list of containers (nexus and nodes) that are parameters to the map, ends comprises a multiset of nodes and/or raw data that is navigated, and said nexus may have an arbitrary number of ends.

9. The data structure of claim 7, further comprising:
a sixth software object comprising a nexus to connect said fourth node to another node or nexus.

10. An apparatus to represent and store information for a user application, said apparatus comprising:
a storage device containing a library having a module to generate an information-container, said module allowing for:
generating a first software object comprising a first node;
generating a second software object comprising a second node;
generating a third software object comprising a nexus that connects said first node and said second node, said nexus being a type of link or an extension of a hypergraph link;
performing at least one of the following:
generating a fourth software object as a third node, said third node comprising said first node, said second node, and said nexus; and
generating a fifth software object as a fourth node, said fourth node comprising said nexus; and
a processor executing an Application Program Interface (API) to allow a user to fill in data for each said information-container generated by said library module,
wherein said first node, said second node, and said third node serve as respective information containers directly addressable by a user and each of the nodes has a format as a tuple:

$S=[Label], N, C$ where the label comprises a name which is optional, and N and C comprise two collections of nexus representing, respectively, a neighborhood and a content of S.

11. The apparatus of claim 10, wherein nexus having a format as a tuple:

$<SE, TE, [label], [label-Param], map, [mapParam]>$ where SE and TE are collections, optionally ordered, of containers (nexus and nodes), representing source ends and target ends, respectively, (collectively, "ends"), label is optional and comprises one of a string and a node, labelParam comprises an optional string that names the target ends and is used to name the members of TE when accessed through the nexus, map comprises a procedure that runs every time the nexus is referenced, and returns TE, mapParam comprises a list of containers (nexus and nodes) that are parameters to the map, ends comprises a multiset of nodes and/or raw data that is navigated, and said nexus may have an arbitrary number of ends.

12. The apparatus of claim 10, said module further allowing:
generating a sixth software object comprising a nexus to connect said fourth node to another node or nexus.

13. A network executing a method to represent and store information for a user application, said network comprising:
at least one computer executing a middleware module having the ability to do at least one of the following:
generate an information-container using a format of representing information including:
generating a first software object comprising a first node;
generating a second software object comprising a second node;
generating a third software object comprising a nexus that connects said first node and said second node, said nexus being a type of link or an extension of a hypergraph link; and
performing at least one of the following:
generating a fourth software object as a third node, said third node comprising said first node, said second node, and said nexus; and
generating a fifth software object as a fourth node, said fourth node comprising said nexus; and
allowing a user to fill in data for each said information-container generated by said method,
wherein said first node, said second node, and said third node serve as respective information containers directly addressable by a user and each of the nodes has a format as a tuple:

$S=[Label], N, C$ where the label comprises a name which is optional, and N and C comprise two collections of nexus representing, respectively, a neighborhood and a content of S.

14. The network of claim 13, said nexus having a format as a tuple $<SE, TE, [label], [label-Param], map, [mapParam]>$ where SE and TE are collections, optionally ordered, of containers (nexus and nodes), representing source ends and target ends, respectively, (collectively, "ends"), label is optional and comprises one of a string and a node, labelParam comprises an optional string that names the target ends and is used to name the members of TE when accessed through the nexus, map comprises a procedure that runs every time the nexus is referenced, and returns TE, mapParam comprises a list of containers (nexus and nodes) that are parameters to the map, ends comprises a multiset of nodes and/or raw data that is navigated, and said nexus may have an arbitrary number of ends.

15. The network of claim 13, said method stored in said middleware module further comprising:

generating a sixth software object comprising a nexus to connect said fourth node to another node or nexus.

16. A storage medium tangibly embodying a program of machine-readable instructions executable by a digital processing apparatus to perform a method of representing information, said method comprising:

generating a first software object comprising a first node;

generating a second software object comprising a second node; and generating a third software object comprising a nexus that connects said first node and said second node, said nexus being a type of link or an extension of a hypergraph link, wherein said method further allows at least one of the following:

a fourth software object to be generated as a third node, said third node comprising said first node, said second node, and said nexus; and said nexus to be included in a fifth software object generated to be a fourth node, wherein said first node, said second node, and said third node serve as respective information containers directly addressable by a user and each of the nodes has a format as a tuple:

$$S=[Label], N, C>$$

where the label comprises a name which is optional, and N and C comprise two collections of nexus representing, respectively, a neighborhood and a content of S.

17. The storage medium of claim 16, said nexus having a format as a tuple:

$$<SE, TE, [label], [label\text{-}Param], map, [mapParam]>$$

where SE and TE are collections, optionally ordered, of containers (nexus and nodes), representing source ends and target ends, respectively, (collectively, "ends"), label is optional and comprises one of a string and a node, labelParam comprises an optional string that names the target ends and is used to name the members of TE when accessed through the nexus, map comprises a procedure that runs every time the nexus is referenced, and returns TE, mapParam comprises a list of containers (nexus and nodes) that are parameters to the map, ends comprises a multiset of nodes and/or raw data that is navigated, and said nexus may have an arbitrary number of ends.

18. The storage medium of claim 16, said method further comprising:

selectively generating a sixth software object comprising a nexus to connect said fourth node to another node or nexus.

* * * * *